United States Patent [19]
Kondo et al.

[11] Patent Number: 6,023,526
[45] Date of Patent: Feb. 8, 2000

[54] APPARATUS OF OPTICALLY READING CHARACTER AND METHOD THEREOF

[75] Inventors: Katsuhiko Kondo; Yasuharu Itamoto; Masato Iwakawa, all of Tokyo, Japan

[73] Assignee: NEC Corporation, Tokyo, Japan

[21] Appl. No.: 08/795,787

[22] Filed: Feb. 5, 1997

[51] Int. Cl.[7] .............................. G06K 9/00; G06K 9/46
[52] U.S. Cl. .................... 382/165; 382/164; 382/101; 358/538
[58] Field of Search ................................. 382/165, 164, 382/162, 163, 101, 199; 358/538

[56] References Cited

U.S. PATENT DOCUMENTS

| | | | |
|---|---|---|---|
| 3,973,239 | 8/1976 | Kakumoto et al. | 340/146.3 AG |
| 5,010,580 | 4/1991 | Vincent et al. | 382/163 |
| 5,307,419 | 4/1994 | Tsujino et al. | 382/199 |
| 5,335,292 | 8/1994 | Lovelady et al. | 382/163 |
| 5,459,797 | 10/1995 | Sato | 382/165 |
| 5,539,523 | 7/1996 | Nakai et al. | 382/165 |

FOREIGN PATENT DOCUMENTS

| | | | |
|---|---|---|---|
| 0326436A2 | 8/1989 | European Pat. Off. | G06K 9/38 |
| 0504576A2 | 9/1992 | European Pat. Off. | G06K 9/20 |
| 4-54578 | 2/1992 | Japan | G06K 9/20 |

OTHER PUBLICATIONS

Patent Abstracts of Japan, vol. 96, No. 4, Apr. 30, 1996 corresponding to JP 07 325045 A (NEC Corp.), Dec. 13, 1995.

Patent Abstracts of Japan, vol. 96, No. 9, Sep. 30, 1996 corresponding to JP 08 123901 A (NEC Corp.) May 17, 1996.

*Primary Examiner*—Jose L. Couso
*Assistant Examiner*—Matthew C. Bella
*Attorney, Agent, or Firm*—Sughrue, Mion, Zinn, MacPeak & Seas, PLLC

[57] ABSTRACT

A multi color image of a total of a sheet of paper is read by a color scanner and a designated color image consisting of a designated color component is extracted from the multi color image by a designated color filter, blocks having the designated color are extracted by summarizing in blocks a plurality of pixels constituting the designated color image by a designated color block extracting unit, meanwhile, the multi color image is converted into a monochromatic image by a monochromatic processing unit, at least one of monochromatic blocks are extracted by summarizing in blocks a plurality of pixels constituting the monochromatic image by a monochromatic block extracting unit and an area in which characters, for example the postal code and the mail address, that are objects of reading on the sheets of paper are described, are determined based on the blocks having the designated color and the monochromatic blocks by a reading area determining unit.

18 Claims, 8 Drawing Sheets

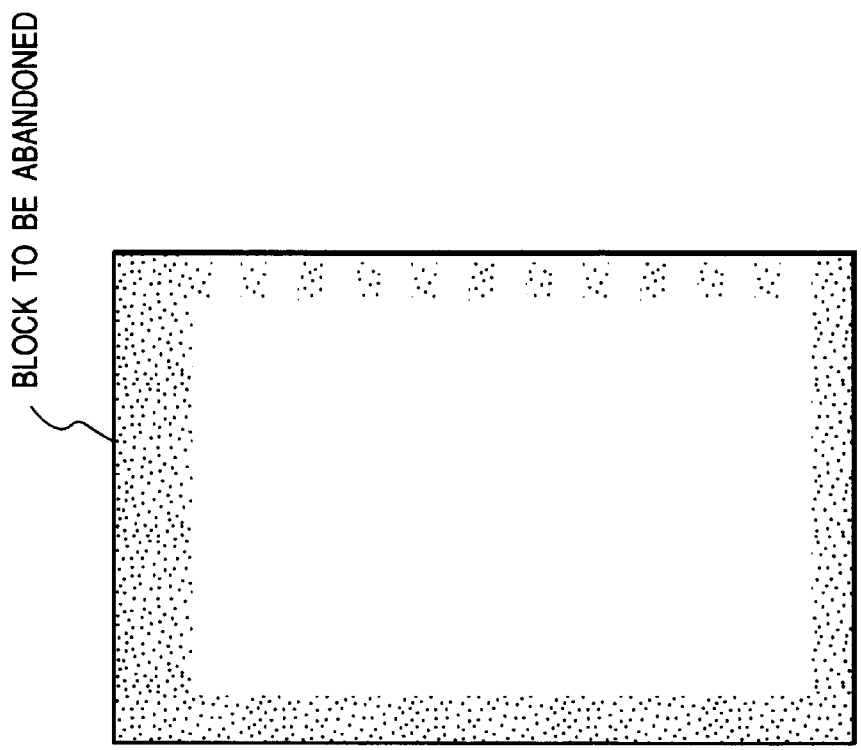
Fig. 4B A CASE WHERE INFORMATION PARTICULAR TO MAIL COULD NOT BE DETECTED
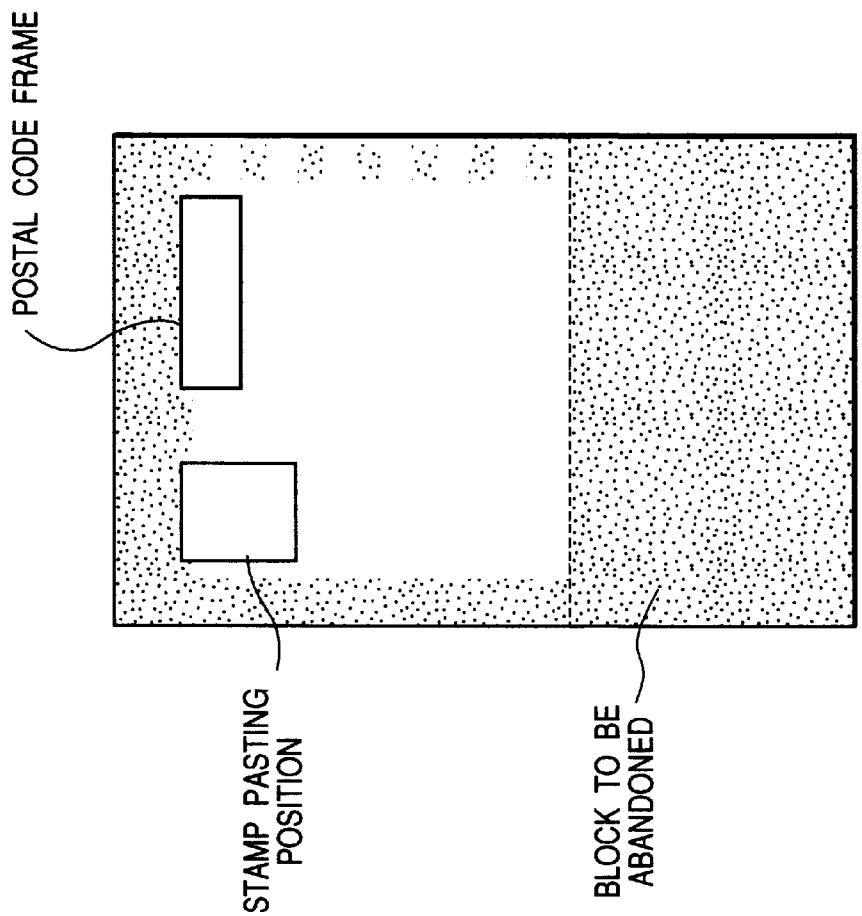
Fig. 4A A CASE WHERE STAMP, POSTAL CODE ETC. ARE PRESENT

APPARATUS OF OPTICALLY READING CHARACTER AND METHOD THEREOF

BACKGROUND OF THE INVENTION

1. Field of the Invention

The present invention relates to a optical character reading apparatus, particularly to a optical character reading apparatus for reading character, for example, a postal code (zip code) or a mail address, described on a sheet of paper where a background is printed in multi colors.

2. Description of the Related Art

In reading a postal code or a mail address described on a mail, generally, an area in which the postal code or the address is described is determined and the postal code or the address is read according to image information corresponding to the area.

Similarly, in reading a postal code or an address described on a mail where a background is printed in multi colors, positions on a mail on which the postal code or the address is described must accurately be located. A conventional character reading apparatus for reading character described on a mail printed in multi colors has been disclosed in Japanese Unexamined Patent Publication JP-A-4-54578.

According to the conventional character reading apparatus, attention is paid to the fact that the postal code or the address on a mail printed in multi colors such as a direct mail, is generally printed in black or in blue. Further, the position on which the postal code or the address is described is determined based on color distribution on the surface of a mail, especially a distribution of black pixels or blue pixels.

The color distribution on the surface is very complicated in a mail that is printed with a picture or a color photograph constituted by many colors as the background. Therefore, a number of black pixels or blue pixels distributed complicatedly and discretely need to be processed in the conventional character reading apparatus. Hence, an enormous amount of image processing calculation is necessary to accurately determining the position of describing the postal code or the address.

Moreover, according to the conventional character reading apparatus, the position of describing the postal code or the address is determined by utilizing only the color distribution on the surface of a mail based on information in respect of black pixels or blue pixels which constitute the describing color of the postal code or the like. Accordingly, when there are black pixels constituting some letter design or the like as a background in the vicinity of the postal code or the address, it is difficult to differentiate the letter design from the postal code or the address. In such a case a portion of the letter design may be included in the determined area of describing the postal code or the address.

SUMMARY OF THE INVENTION

It is an object of the present invention to provide an apparatus for optically reading character and its method capable of accurately extracting an area on which characters are described on a sheet of paper or the like where a background is printed in multi colors.

It is another object of the present invention to provide a apparatus for optically reading character and its method capable of reading at high speed characters described on a sheet of paper or the like where a background is printed in multi colors.

To achieve the above-described object, a apparatus for optically reading character in accordance with the present invention, includes a scanner for reading a multi color image on a surface of a sheet printed in multi colors, a filter for extracting a color image consisting of a predetermined color component, a first processor for converting the multi color image read by the scanner into a monochromatic image, a second processor for determining an area where an object of reading on the sheet is described based on the color image extracted by the filter and the monochromatic image converted from the multi color image by the first processor and a third processor for recognizing the object of reading described in the area determined by the second processor.

Further, a method of recognizing character in accordance with the present invention comprises the steps of reading a multi color image on a surface of a sheet, extracting a color image consisting of a designated color component from the multi color image, converting the multi color image into a monochromatic image, determining an area for reading character described on the sheet based on the designated color image and the monochromatic image and recognizing the character described at the determined area.

BRIEF DESCRIPTION OF THE DRAWINGS

The above and other objects, features and advantages of the present invention will become more apparent from the following detailed description taken with the accompanying drawings in which:

FIG. 4 is a view for explaining the operation of the reading area determining unit in the first embodiment of the present invention;

DETAILED DESCRIPTION OF PREFERRED EMBODIMENTS

Next, a detailed explanation will be given of embodiments of the present invention in reference to the drawings.

According to the first embodiment of the present invention, a designated color image constituted only by predetermined color pixels is extracted from a multi color image provided from the surface of a mail and first block information provided by forming blocks of color pixels constituting the designated color image, is extracted. Meanwhile, second block information of monochromatic pixels provided from a monochromatic image that is obtained from the surface of the mail, is extracted. An area where a postal number or an address is described is determined based on the first block information and the second block information.

Figure 1:
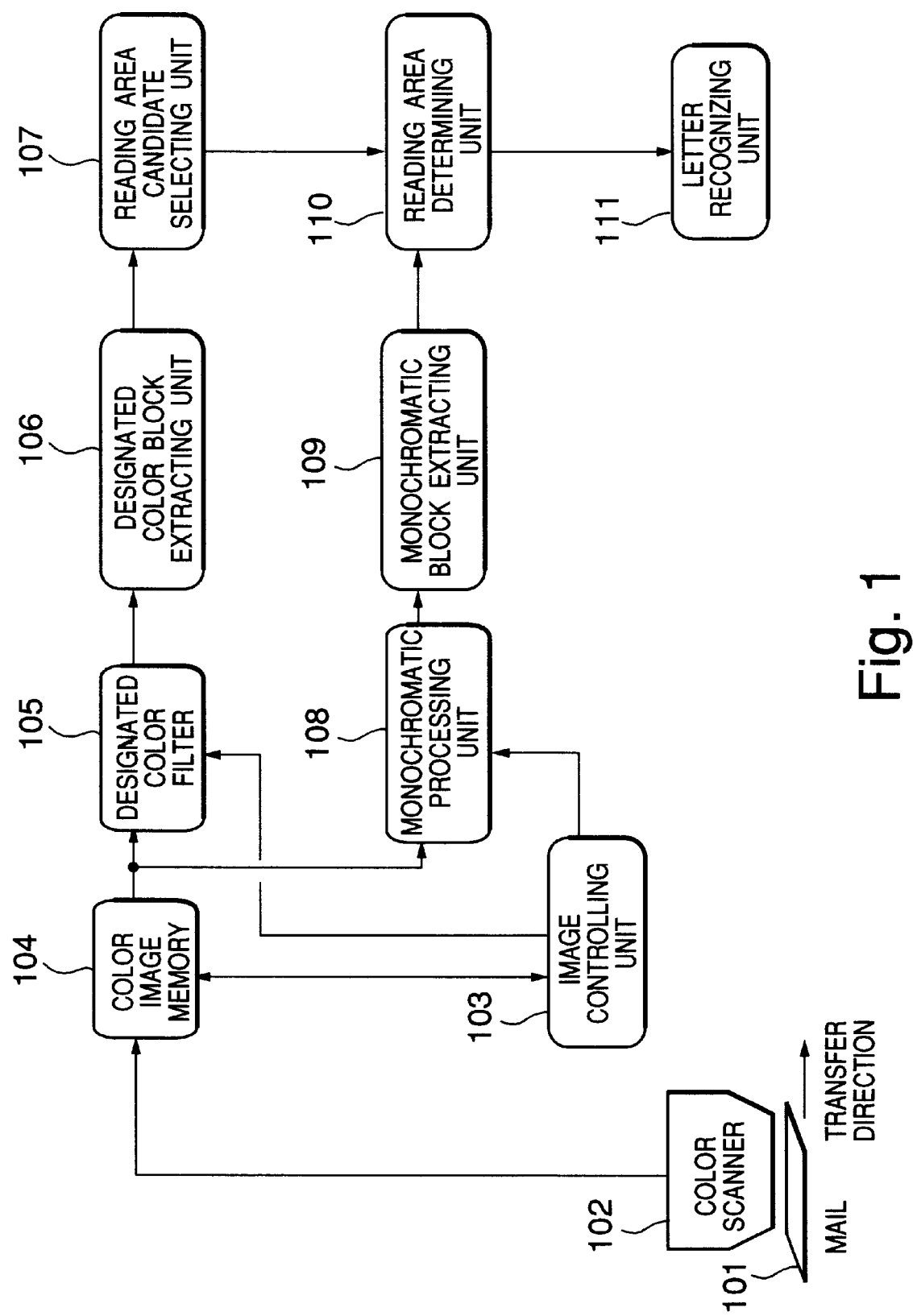
FIG. 1 is a block diagram showing the constitution of the first embodiment of the present invention.

Referring to FIG. 1, a color scanner 102 reads a multi color image that is obtained by optically scanning substantially a total of the surface of a mail 101 transferred on a transfer path. An image controlling unit 103 designates a color component of characters that are to be the object of reading, that is, a color component of pixels to be extracted by a designated color filter 105, to the designated color filter 105 based on a multi color image stored in a color image memory 104.

Figure 2:
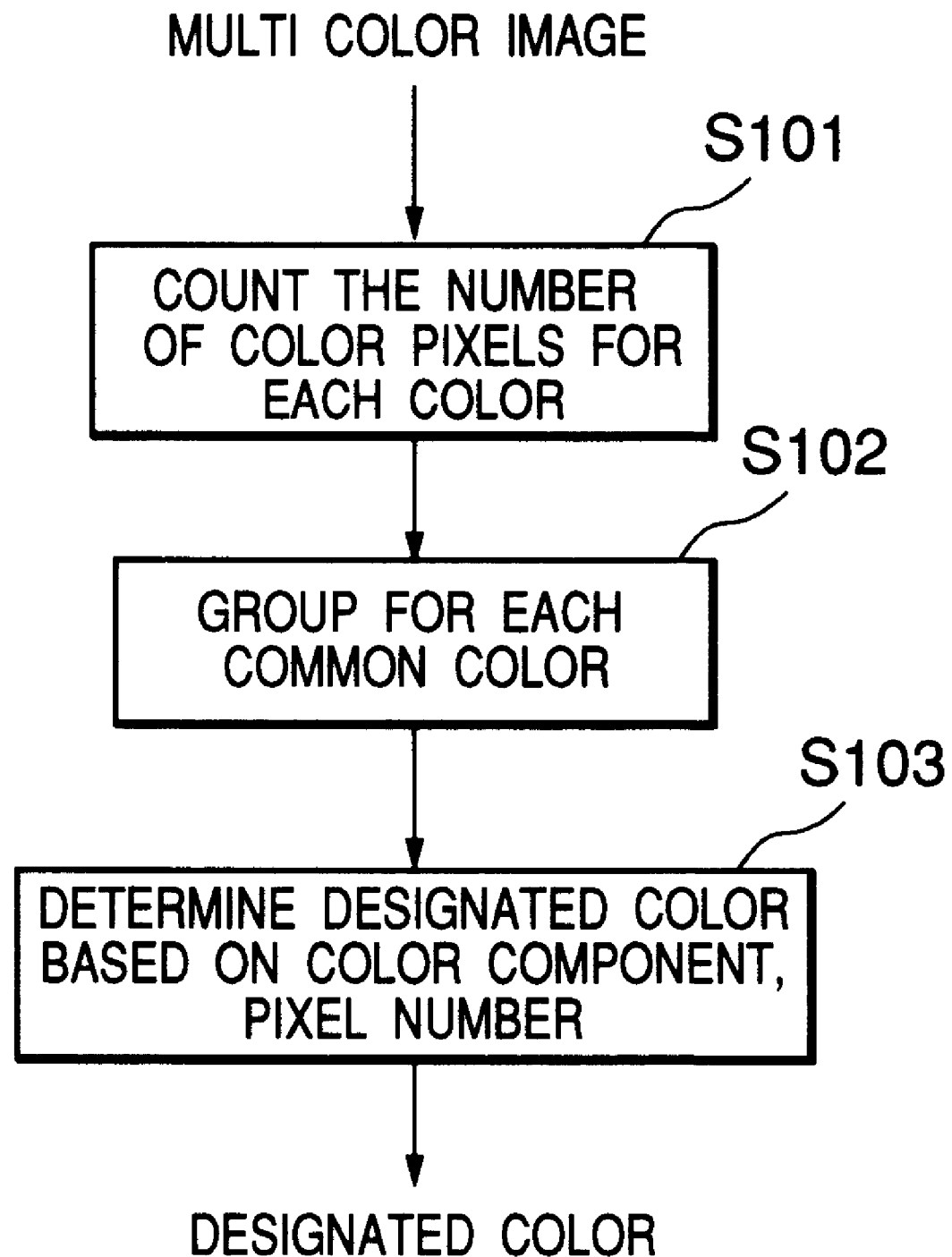
FIG. 2 is a flowchart showing a method of determining a designated color in the first embodiment of the present invention.

Here, an explanation will be given of the procedure of designating the color component to the designated color filter 105 by the image controlling unit 103 in reference to FIG. 2.

First, the image controlling unit 103 reads the multi color image from the color image memory 104 and counts the number of pixels constituting the multi color image for each color component (S101). Further, a plurality of color components are grouped for each common color(S102). Color components which are to be classified into the same groups are previously set and color components representing respective groups are also set. Here, a color component having a count number of pixels smaller than a predetermined value is excluded without classifying it into a group. Finally, color components representing respective groups and numbers of pixels counted for the respective groups are analyzed and a color component mostly suitable as a color of describing the address or the postal code, is determined as a designated color and is outputted to the designated color filter 105 (S103).

Incidentally, the method of determining the color component that is designated to the designated color filter 105, is not limited to the above-described procedure but may be determined by a distribution of a plurality of color components constituting the multi color image, or the like. Further, the color component may previously be set to a color that is frequently used as a color for describing character that is the object of reading, for example, black or blue.

Now, the explanation will be continued by going back to FIG. 1. The image controlling unit 103 further reads the multi color image stored in the color image memory 104 and transmits the multi color image to the designated color filter 105. The transmitted multi color image is converted into a designated color image comprising only color pixels having a designated color component (hereinafter, designated color pixel) by removing color pixels constituting characters or a background described or printed by colors other than the color component designated by the image controlling unit 103 by passing through the designated color filter 105. The designated color image provided by the conversion at the designated color filter 105, is transmitted to a designated color block extracting unit 106. The designated color block extracting unit 106 summarizes a plurality of designated color pixels into at least one block (hereinafter, designated color block) based on the locations of the designated color pixels constituting the designated color image and the number of the continuously existing designated color pixels. Further, the designated color block extracting unit 106 extracts designated color block information including the positions of the summarized designated color blocks and their sizes and supplies them to a reading area candidate selecting unit 107. That is, information with respect to the designated color pixels which are not summarized in blocks by the designated color block extracting unit 106, is excluded. The reading area candidate selecting unit 107 excludes designated color blocks which are clearly determined not to be in correspondence with the reading area among the designated color blocks and information with respect to the designated color blocks, from the supplied designated color block information. For example, a designated color block that is smaller than an allowable range of a size of the predetermined area of describing the postal code or the address or a designated color block larger than that is excluded by the unit 107. When the designated color pixels are discretely present in an area of a background of a mail, for example, a color photograph or the like, this processing removes the discrete designated color pixels in blocks. Further, a designated color block provided by small dirt etc. adhered onto a mail can be excluded. Further, the reading area candidate selecting unit 107 supplies a reading region determining unit 110 with the designated color block information in respect of designated color blocks which remain without being excluded as reading candidate block information.

Meanwhile, the image controlling unit 103 transmits the multi color image stored in the color image memory 104 to a monochromatic processing unit 108. The monochromatic processing unit 108 converts the transferred multi color image into a monochromatic image by binarizing the multi color image by a predetermined threshold value and supplies it to a monochromatic block extracting unit 109. The monochromatic block extracting unit 109 summarizes the monochromatic pixels into at least one block (hereinafter, monochromatic block) of at least one or more based on locations of the monochromatic pixels constituting the monochromatic image and the number of the continuously existing monochromatic pixels. Further, the monochromatic block extracting unit 109 extracts monochromatic block information including the locations or sizes of the summarized monochromatic blocks and supplies it to the reading area determining unit 110.

The reading area determining unit 110 checks the appropriateness of the reading candidate blocks supplied from the reading area candidate selecting unit 107 based on the monochromatic block information provided by the monochromatic block extracting unit 109 and determines final reading areas.

A character recognizing unit 111 recognizes characters described with a designated color in the reading areas determined by the reading area determining unit 110 thereby reading the postal code or the address or the like.

Figure 3:
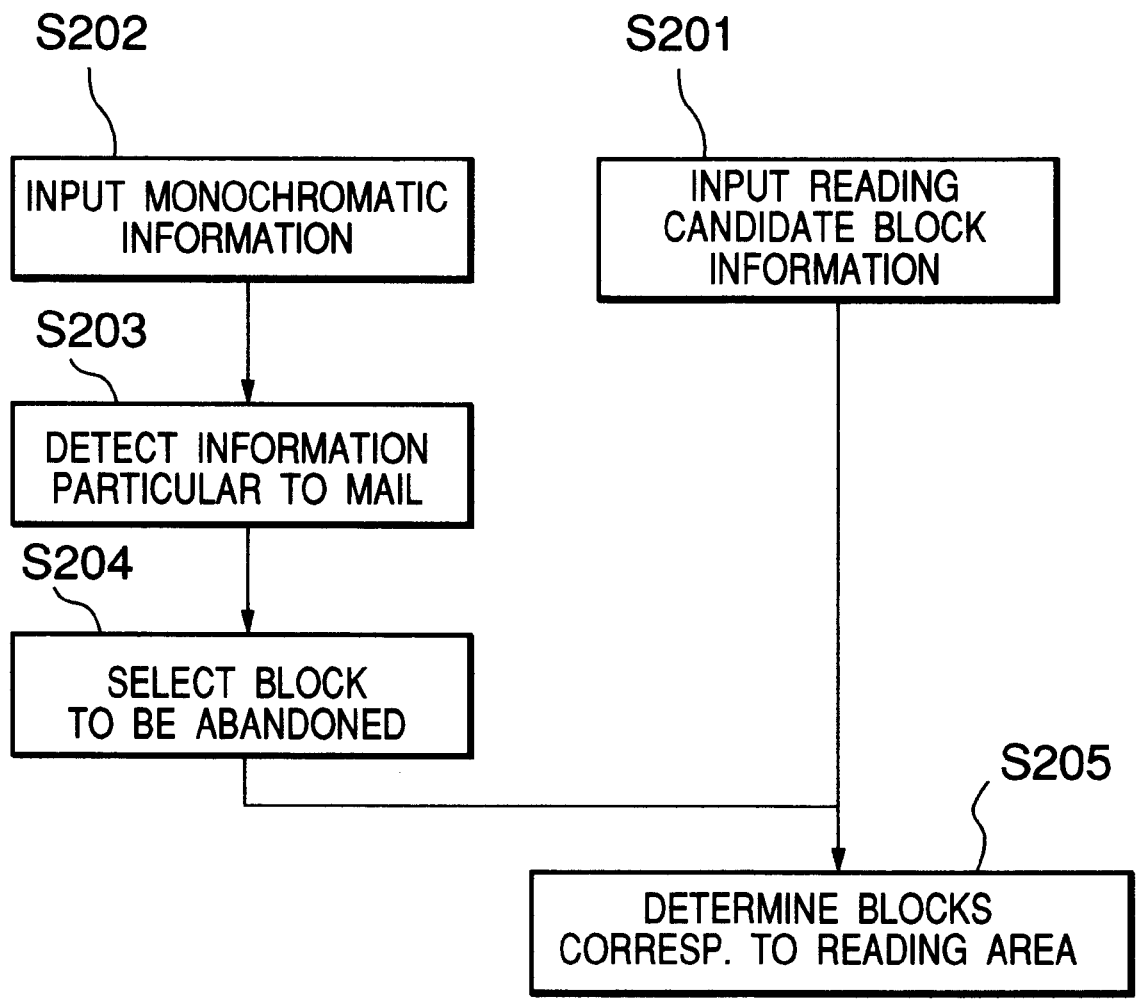
FIG. 3 is a flowchart showing the operation of a reading area determining unit in the first embodiment of the present invention.

Here, an explanation will be given of the operation of the reading area determining unit 110 in reference to FIG. 3 and FIGS. 4A and 4B.

The reading area determining unit 110 inputs the reading candidate block information from the reading area candidate selecting unit 107 (S201) and inputs the monochromatic information from the monochromatic block extracting unit 109 (S202). Further, the reading area determining unit 110 detects information particular to a mail such as a postal code frame, positional information of a stamp or a deferred payment mark based on the sizes or locations of the monochromatic blocks included in the inputted monochromatic block information (S203). Also, the reading area determining unit 110 analyzes the monochromatic block information supplied from the monochromatic block extracting unit 109 based on the detected information particular to a mail and selects monochromatic blocks which are not in correspondence with areas where the postal code or the address is present as blocks to be abandoned (S204). FIG. 4A is a view showing an example of a block to be abandoned that is selected by utilizing the information particular to a mail such as a position for pasting a stamp, a postal code frame or the like and a netted area designates the block to be abandoned. Further, FIG. 4B is a view showing an example of a block to be abandoned that is selected without using the information particular to the postal code since the information could not be detected, in which a netted area designates the block to be abandoned as in the former case. Finally, blocks which are not included in the blocks to be abandoned, are determined as final reading areas among the designated color blocks defined by the reading candidate block information by comparing the reading candidate block information supplied from the reading area candidate selecting unit 107, with information in respect of size and information in respect of position concerning the selected blocks to be abandoned (S205).

Next, an explanation will be given of the operation of the embodiment in reference to FIG. 5 through FIG. 10.

Figure 5:
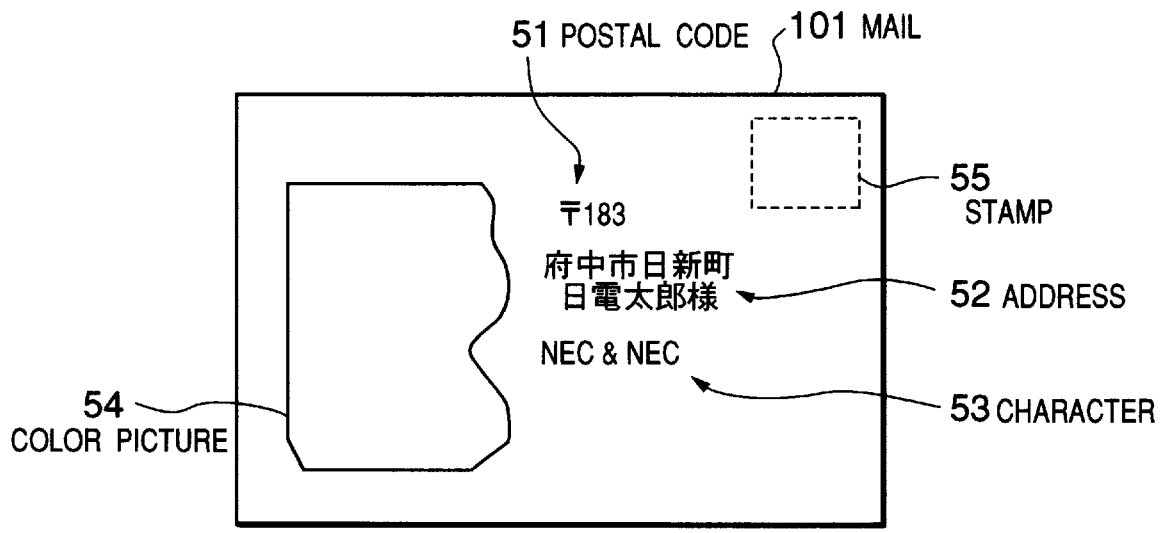
FIG. 5 is a view showing an example of a mail capable of reading by an apparatus of reading letter in the first embodiment of the present invention.
Figure 6:
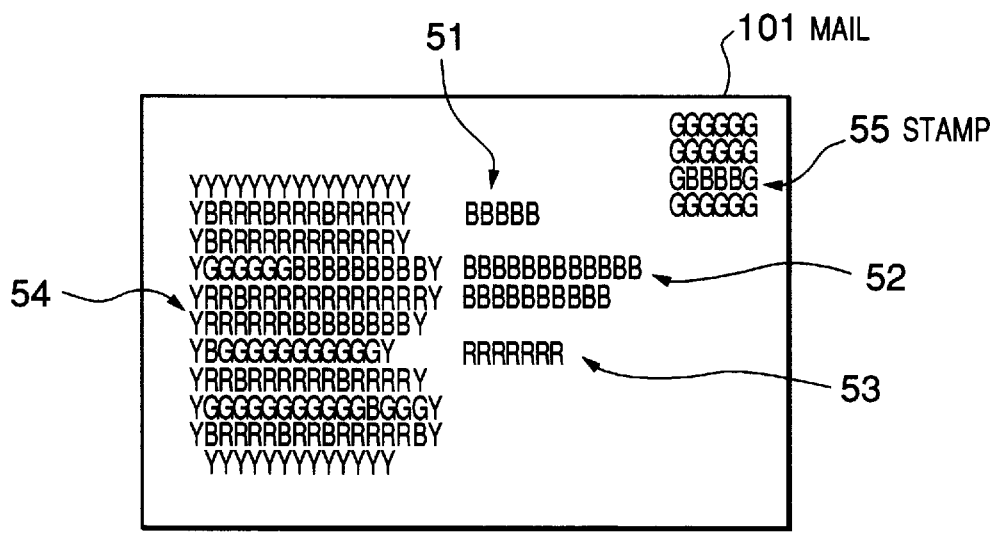
FIG. 6 is a view showing a multi color image provided by the mail illustrated in FIG. 5.

FIG. 5 indicates a mail 101 on which a postal code 51 and an address 52 to be read by a device of reading character according to the embodiment, are described or printed. Red character design "NEC & NEC" 53 is printed in the vicinity of the address 52 and a color photograph (or multi color picture) 54 and a stamp 55 are added thereto in the mail 101. The multi color image provided by optically scanning the mail 101 by the color scanner 102, is stored to the color image memory 104. FIG. 6 is a view showing the multi color image stored in the color image memory 104, in which notations G, B, R and Y respectively correspond to a green pixel, a black pixel, a red pixel and a yellow pixel.

Figure 7:
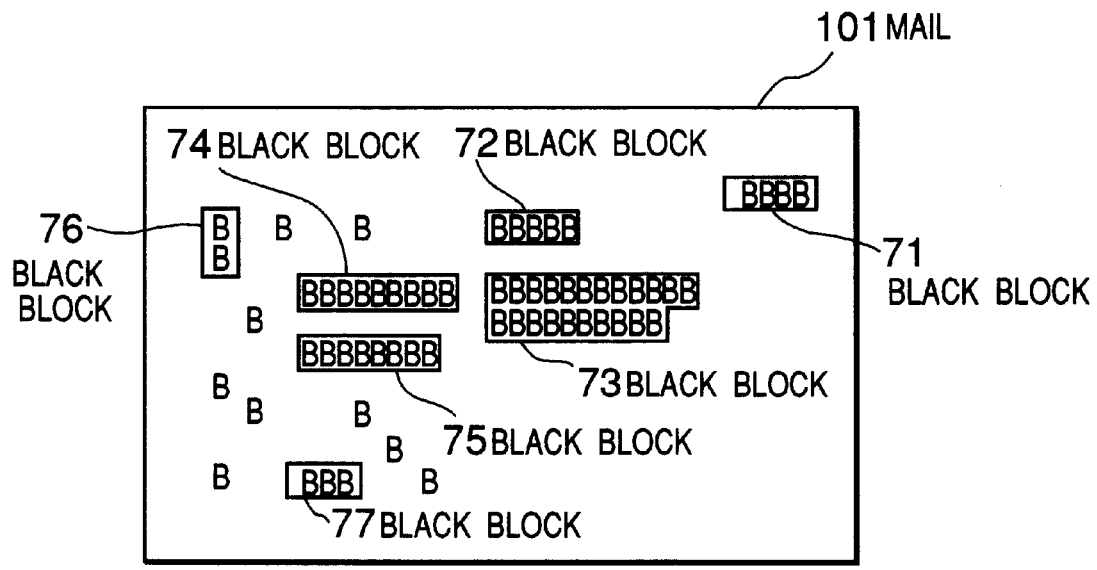
FIG. 7 is a view showing a designated color image and designated color blocks provided from the multi color image illustrated by FIG. 6.

The image controlling unit 103 determines the designated color as, for example, black color based on the multi color image stored in the color image memory 104 and designates the black color to the designated color filter 105 and supplies the multi color image stored in the memory 104 to the designated color filter 105. The designated color filter 105 passes only the designated black pixels from the supplied multi color image and outputs the designated color image constituted only by the black pixels (B) as shown by FIG. 7. All of the color pixels except the black pixels (B) are removed from the multi color image by the operation of the designated color filter 105. Therefore, the red pixels (R) corresponding to the character design "NEC & NEC" 53 printed at the vicinity of the area of the postal code 51 or the address 52, are removed and therefore, the area of the character design and the area of the address can easily be differentiated from each other.

The designated color block extracting unit 106 forms blocks by summarizing the black pixels having a predetermined number of pixels, for example, 2 pixels or more with respect to the designated color image provided by passing through the designated color filter 105 thereby providing the designated color blocks. In this embodiment, the designated color block is a black block consisting of the block pixels since the designated color is black. Further, the designated color block extracting unit 106 supplies the reading area candidate selecting unit 107 with the designated color block information including the positions and sizes of the black blocks 71 through 77 which correspond to the designated color blocks. Here, information with respect to the black pixels (B) which are not included in any of the black blocks among the black pixels (B) shown by FIG. 7, is excluded without being supplied to the reading area candidate selecting unit 107.

Figure 8:
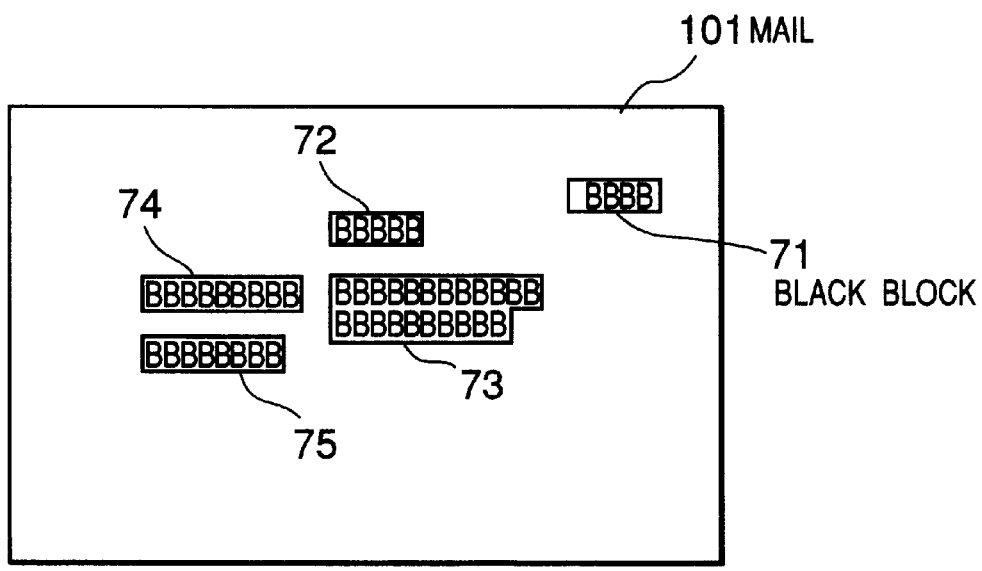
FIG. 8 is a view showing reading candidate blocks provided by a reading area candidate selecting unit based on the designated color image illustrated by FIG. 7.

The reading area candidate selecting unit 107 excludes each of the black blocks where the number of pixels of the black pixels (B) constituting the black block is smaller than a predetermined value, for example, the black block 76 or 77 where the number of pixels is 3 or less. Further, the designated color block information including information of sizes and positions of the black blocks 71 through 75 which may be the reading areas, is supplied to the reading area determining unit 110 as the reading area block information. Incidentally, FIG. 8 is a view showing the black blocks 71 through 75 corresponding to the reading candidate block information supplied from the reading area candidate selecting unit 107 to the reading area determining unit 110 according to the embodiment.

Figure 9:
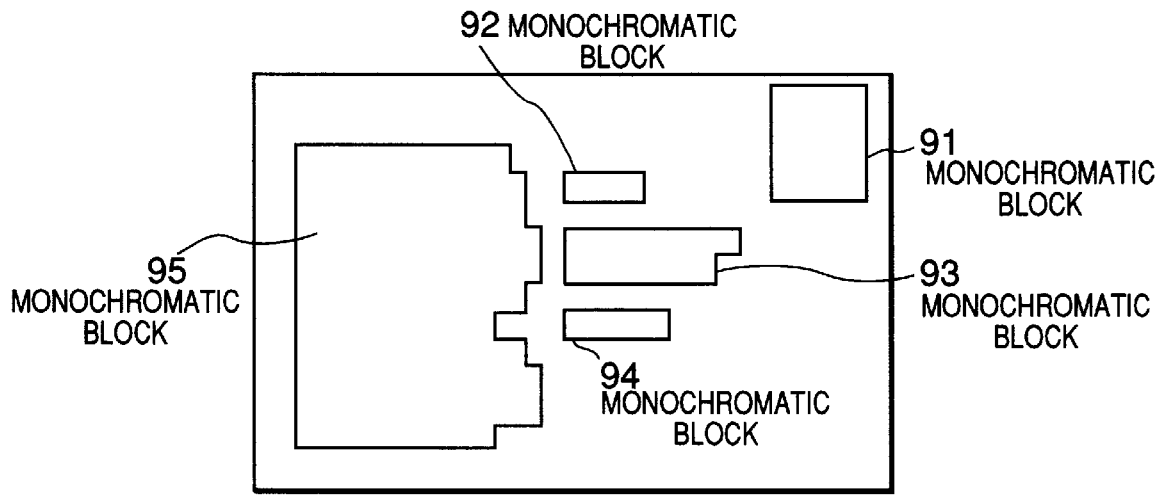
FIG. 9 is a view showing monochromatic block information extracted based on a monochromatic image provided from the multi color image illustrated by FIG. 6.

Meanwhile, the multi color image shown by FIG. 6 is supplied to the monochromatic processing unit 108 by reading it from the multi color image memory 104 by the image controlling unit 103. According to the monochromatic processing unit 108, the multi color image is binarized by a predetermined threshold value whereby the monochromatic image is provided. In the monochromatic image areas corresponding to a stamp, a photograph, a character, a character design etc. are constituted by black pixels and a background area is constituted by white pixels. The monochromatic block extracting unit 109 provides monochromatic blocks 91 through 95 as shown by FIG. 9 by forming blocks from a plurality of aggregations of the black pixels corresponding to characters or character design based on the monochromatic image. Further, information of size and position with respect to the monochromatic blocks 91 through 95 provided by the monochromatic block extracting unit 109, is supplied to the reading area determining unit 110 as the monochromatic block information.

Figure 10:
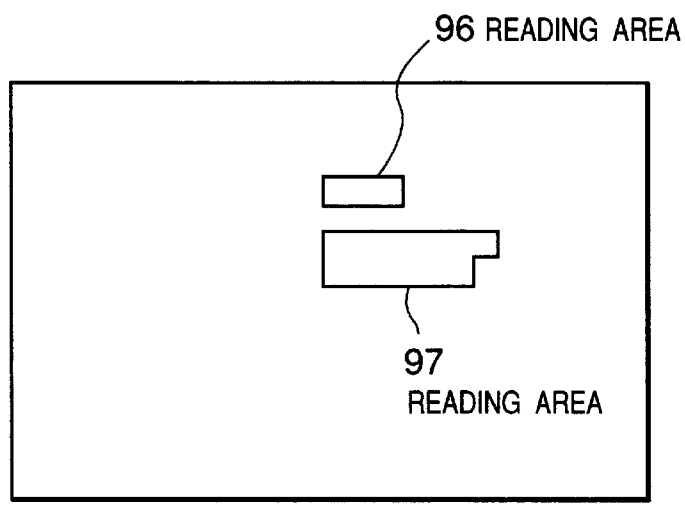
FIG. 10 is a view showing reading areas determined in respect of the mail illustrated by FIG. 5.

The reading area determining unit 110 determines the reading areas based on the reading area candidate block information and the monochromatic block information respectively supplied from the reading area candidate selecting unit 107 and the monochromatic block extracting unit 109. That is, the information particular to a mail is detected based on the monochromatic block information including information of size and position with respect to the monochromatic blocks 91 through 95 shown by FIG. 9. According to the embodiment, the monochromatic block 91 is detected to be a monochromatic block corresponding to a stamp. Further, the black blocks 72 and 73 among the black blocks 71 through 75 of the reading candidate block information shown by FIG. 8, are determined as reading areas 96 and 97 where the postal code and the address are described, by utilizing the information particular to a mail. The reading areas 96 and 97 are shown in FIG. 10. Further, the character recognizing unit 111 recognizes characters described in the reading areas 96 and 97 which have been determined to be the reading areas, whereby the postal code and the address are read.

According to the embodiment, a color image processing system including the designated color filter 105, the designated color block extracting unit 106 and the reading area candidate selecting unit 107 and a monochromatic image processing system including the monochromatic processing unit 108 and the monochromatic block extracting unit 109, are operated in parallel whereby the processing time period is considerably shortened. The image controlling unit 103 supplies the multi color image read from the color image memory 104 to both of the designated color filter 105 and the monochromatic processing unit 108 substantially at a simultaneous timing whereby the block extraction or the like can be executed substantially simultaneously in respect both of the multi color image and the monochromatic image.

Incidentally, the image controlling unit 103, the designated color block extracting unit 106, the reading area candidate selecting unit 107, the monochromatic processing unit 108, the monochromatic block extracting unit 109, the reading area determining unit 110 and the character recognizing unit 111 can be realized by microprocessors or digital signal processors.

Next, an explanation will be given of the second embodiment of the present invention in reference to the drawing.

The apparatus according to the second embodiment is similar to that according to the above-described first embodiment except the means for providing the monochromatic image and accordingly, an explanation of duplicated portions will be omitted.

Figure 11:
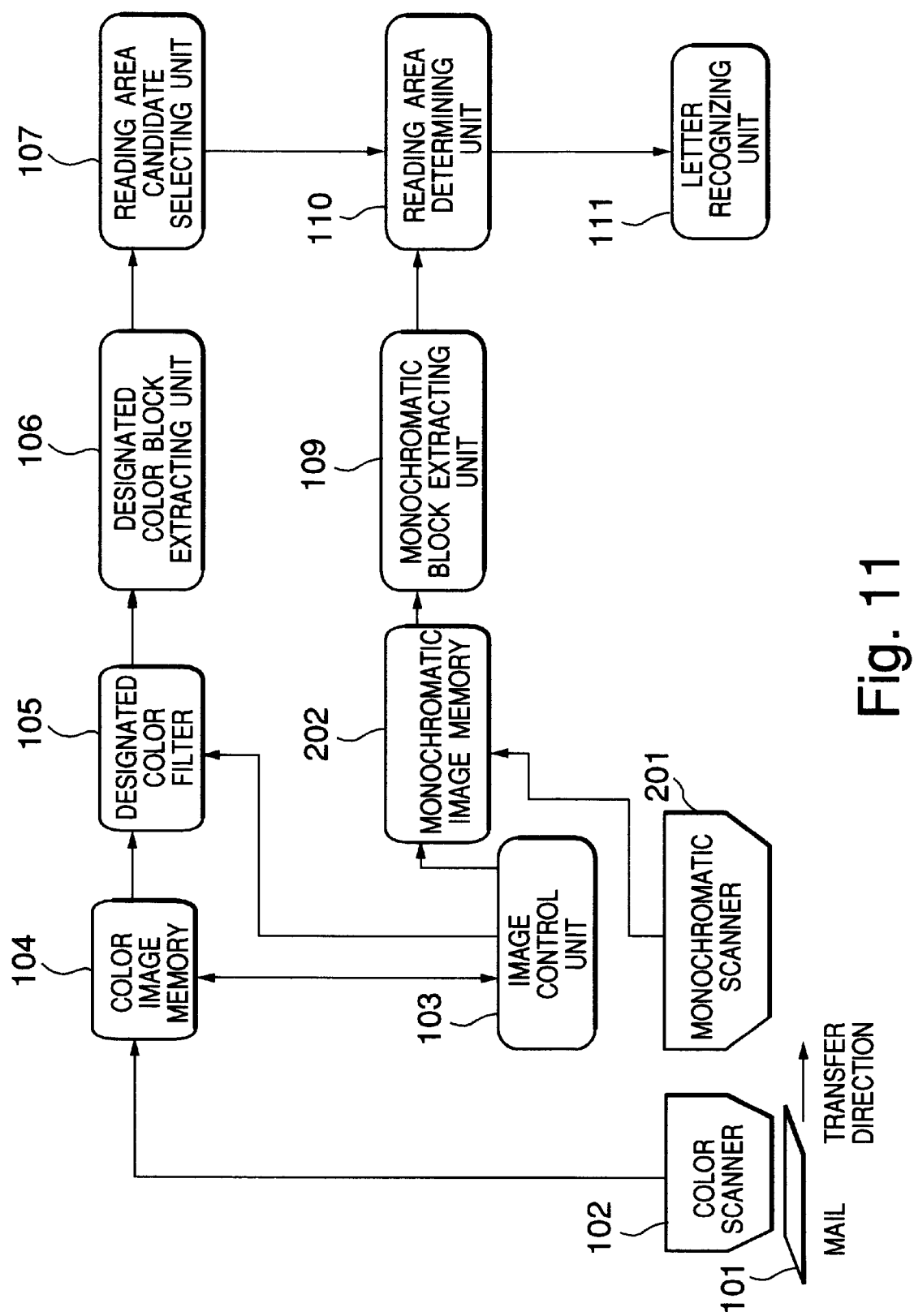
FIG. 11 is a block diagram showing the constitution of the second embodiment of the present invention.

Referring to FIG. 11, a monochromatic scanner 201 reads the monochromatic image by optically scanning the mail 101 transferred on the transfer path. A monochromatic image memory 202 stores the monochromatic image read by the monochromatic scanner 201. Further, the image controlling unit 103 reads the monochromatic image from the monochromatic image memory 202 and supplies it to the monochromatic block extracting unit 109. The other processing are the same as those in the above-described first embodiment. According to the embodiment, the monochromatic image is not provided by binarizing the multi color image read by the color scanner 102 by the monochromatic processing unit 108 as in the first embodiment, but the monochromatic image is directly read by the monochromatic scanner 201 provided separately from the color scanner 102.

As described above, the reading area on a sheet of paper is determined based on the designated color image provided by the multi color image and the monochromatic image provided by the multi color image and accordingly, the area of describing the postal code or the address described on a mail printed in multi colors can accurately be determined. Further, the postal code or the address can be read at high speed and with accuracy since the area where the postal code or the address is described can accurately be determined.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. An optical reading apparatus comprising:
a reading means for reading a multi color image on a surface of a sheet printed in multi colors;
a first extracting means for extracting a color image consisting of a predetermined color component from said multi color image read by said reading means;
a converting means for converting said multi color image read by said reading means into a monochromatic image;
a first determining means for determining an area where objects of reading are described based on a color image extracted from said multi color image by said first extracting means and said monochromatic image converted from said multi color image by said converting means; and
a recognizing means for recognizing said objects of reading described in said area determined by said determining means, wherein said first determining means comprises:
a second extracting means for extracting at least one first block by summarizing in said at least one first block a plurality of pixels having said predetermined color component constituting said color image extracted by said first extracting means;
a third extracting means for extracting at least one second block by summarizing in said at least one second block a plurality of monochromatic pixels constituting said monochromatic image converted from said multi color image by said converting means; and
a second determining means for determining said area where said objects of reading are described based on information indicated by said at least one first block and said at least one second block.

2. An optical reading apparatus according to claim 1, wherein said first extracting means designates said color component in accordance with values of counting a plurality of pixels constituting said multi color image read by said reading means for each color in said multi color image.

3. An optical reading apparatus according to claim 1, wherein said first extracting means extracts said color image consisting of a predetermined designated color component, in which said objects of reading are described, from said multi color image read by said reading means.

4. An optical reading apparatus as claimed in claim 1, wherein said third extracting means selects at least one block corresponding to said area where said objects of reading are described from said at least one first block based on said information indicated by said at least one second block.

5. An optical reading apparatus according to claim 1, wherein said sheet is a piece of mail in which a background is printed in multi colors and said objects of reading are at least one of a postal code and an address described on said piece of mail.

6. An optical reading apparatus as claimed in claim 1, wherein said sheet is a piece of mail in which a background is printed in multi colors and said second determining means is provided with means for detecting information particular to a piece of mail based on said information by said at least one second block.

7. An optical reading apparatus comprising:
a scanner for reading a multi color image on a surface of a sheet printed in multi colors;
a filter for extracting a color image consisting of a predetermined color component from said multi color image read by said scanner;
a first processor for converting said multi color image read by said scanner into a monochromatic image;
a second processor for determining an area where objects of reading on said sheet are described based on said color image extracted by said filter and said monochromatic image converted from said multi color image by said first processor; and
a third processor for recognizing objects of reading described in said area determined by said second processor, wherein said second processor comprises:
a fourth processor for extracting at least one first block by summarizing at least two pixels having said predetermined color component and constituting said color image extracted by said filter;
a fifth processor for extracting at least one second block by summarizing at least two monochromatic pixels constituting said monochromatic image converted from said multi color image by said first processor; and a sixth processor for determining said area where said objects of reading are described based on first information indicating said at least one first block extracted by said fourth processor and second information indicating said at least one second block extracted by said fifth processor.

8. An optical reading apparatus according to claim 7, wherein said sixth processor selects blocks corresponding to said area in which said objects of reading are described from said at least one first block based on said second information indicating said at least one second block.

9. An optical reading apparatus according to claim 8, wherein said sixth processor excludes blocks having a number of pixels constituting said at least one first block smaller than a predetermined number from objects of selecting blocks corresponding to said area where said objects of reading are described.

10. An optical reading apparatus according to claim 7, wherein said first processor outputs said monochromatic image provided by binarizing said multi color image read by said scanner with a predetermined threshold value.

11. An optical reading apparatus according to claim 7, wherein said first information is at least either of information indicating positions of said at least one first block and information indicating sizes of said at least one first block and said second information is at least either of information indicating positions of said at least one second block and information indicating sizes of said at least one second block.

12. An optical reading apparatus according to claim 7, wherein said at least one first block are extracted by said fourth processor and said at least one second block is extracted by said fifth processor in parallel.

13. An optical reading apparatus according to claim 7, wherein said sheet is a piece of mail in which a background is printed in multi colors and said objects of reading are at least one of a postal code and an address described in one color among color components used in said background on said piece of mail.

14. A method of recognizing characters comprising the steps of:

reading a multi color image on a surface of a sheet;

extracting a color image consisting of a designated color component from said multi color image;

converting said multi color image into a monochromatic image;

determining an area for reading said characters described on said sheet based on said color image and said monochromatic image; and recognizing said characters described in said area, wherein the step of determining the area further comprises:

extracting at least one first block by summarizing in said at least one first block a plurality of pixels having said color component constituting said color image extracted in the step of extracting said color image from said multi color image:

extracting at least one second block by summarizing in said at least one second block a plurality of monochromatic pixels constituting said monochromatic image converted from said multi color image in the step of converting said multi color image into said monochromatic image; and determining an area in which said objects of reading are described based on information indicated in said at least one first block and said at least one second block.

15. The method of recognizing characters according to claim 14, wherein in the step of extracting said color image said color image consisting of said color component designated in accordance with values of counting a plurality of pixels constituting said multi color image read by the step of reading said multi color image for each color extracted.

16. The method of recognizing characters according to claim 14, wherein said sheet is a piece of mail in which a background is printed in multi colors and said objects of reading are at least one of a postal code and an address described on said piece of mail.

17. The method of recognizing character according to claim 14, wherein said sheet is a piece of mail where a background is printed in multi colors and the step of determining an area further comprises the step of detecting information particular to said piece of mail based on said information indicated by said at least one second block.

18. An optical reading apparatus comprising:

a device for reading a multi-color image;

a filter for extracting a color image of a predetermined color component from said multi-color image read by said device;

a first processor for converting said multi-color image into a monochromatic image;

a second processor for determining an area of said multi-color image to be read by checking appropriateness of an area determined from said color image of said predetermined color component based on said monochromatic image converted from said multi-color image by said first processor;

a third processor for recognizing an object to be read contained in said area determined by said second processor, wherein said second processor comprises:

a fourth processor for extracting at least one first block by summarzing at least two pixels having said predetermined color component;

a fifth processor for extracting at least one second block by summarizing at least two monochromatic pixels constituting said monochromatic image; and a sixth processor for determining said area based on first information indicating said at least one first block extracted by said fourth processor and second information indicated by said at least one second block extracted by said fifth processor.

* * * * *